US005478380A

United States Patent [19]

Templey et al.

[11] Patent Number: 5,478,380

[45] Date of Patent: Dec. 26, 1995

[54] CHROMOGENIC COMPOSITION FOR USE IN PRESSURE-SENSITIVE RECORD MATERIAL

[75] Inventors: Margaret P. Templey, Thame; Ivan Sheiham, Marlow; Richard D. Saunders, Windsor, all of England

[73] Assignee: The Wiggins Teape Group Limited, United Kingdom

[21] Appl. No.: 136,036

[22] Filed: Oct. 14, 1993

[30] Foreign Application Priority Data

Oct. 15, 1992 [GB] United Kingdom .................. 9221621

[51] Int. Cl.[6] .................................. C09D 11/02

[52] U.S. Cl. .................................. 106/21 R; 106/21 A

[58] Field of Search .................................. 106/21 R, 21 A; 503/213

[56] References Cited

U.S. PATENT DOCUMENTS

| | | | |
|---|---|---|---|
| 2,800,457 | 7/1957 | Green et al. | 242/316 |
| 2,800,458 | 7/1957 | Green | 252/316 |
| 3,016,308 | 1/1962 | Macaulay | 117/36.7 |
| 3,041,289 | 6/1962 | Katchen et al. | 252/316 |
| 3,672,935 | 6/1972 | Miller et al. | 117/36.8 |
| 3,753,761 | 8/1973 | Sugahara et al. | 117/36.2 |
| 3,966,632 | 6/1976 | Colliopoulos et al. | 252/309 |
| 4,001,140 | 1/1977 | Foris et al. | 252/316 |
| 4,027,065 | 5/1977 | Brockett et al. | 428/307 |
| 4,100,103 | 7/1978 | Foris et al. | 252/316 |
| 4,105,823 | 8/1978 | Hasler et al. | 428/307 |
| 4,386,670 | 8/1983 | Sinclair | 428/321.5 |
| 4,612,254 | 9/1986 | Ginter et al. | 428/531 |
| 4,783,196 | 11/1988 | Eckstein et al. | 8/527 |
| 4,923,641 | 5/1990 | Eckstein et al. | 544/86 |
| 5,084,433 | 1/1992 | Kraft | 503/201 |

FOREIGN PATENT DOCUMENTS

| | | |
|---|---|---|
| 0024898 | 3/1981 | European Pat. Off. . |
| 0024897 | 3/1981 | European Pat. Off. . |
| 0234394 | 9/1987 | European Pat. Off. . |
| 0247816 | 12/1987 | European Pat. Off. . |
| 0262569 | 4/1988 | European Pat. Off. . |
| 0275107 | 7/1988 | European Pat. Off. . |
| 0390432 | 10/1990 | European Pat. Off. . |
| 0428994 | 5/1991 | European Pat. Off. . |
| 0487347 | 5/1992 | European Pat. Off. . |
| 0520639 | 12/1992 | European Pat. Off. . |
| 2618264 | 11/1976 | Germany . |
| 4110354 | 10/1991 | Germany . |
| 49-31414 | 3/1974 | Japan . |
| 51-080685 | 7/1976 | Japan . |
| 59-164186 | 9/1984 | Japan . |
| 05-050746 | 3/1993 | Japan . |
| 805272 | 12/1958 | United Kingdom . |
| 870476 | 6/1961 | United Kingdom . |
| 1320273 | 6/1973 | United Kingdom . |
| 1526363 | 9/1978 | United Kingdom . |
| 2143247 | 2/1985 | United Kingdom . |

OTHER PUBLICATIONS

Chemical Abstracts, vol. 81, No. 12, Sep. 1974, abstract No. 71124 b.

Database WPI, Week 8133, Derwent Publications Ltd, Jul. 1981.

*Primary Examiner*—Helene Klemanski
*Attorney, Agent, or Firm*—Burns, Doane, Swecker & Mathis

[57] ABSTRACT

A chromogenic composition for use in pressure-sensitive record material comprises chromogenic material in an ester vehicle. The ester may be mono-, di- or tri-functional and is of a non-aromatic mono-carboxylic acid having a straight or branched hydrocarbon chain with at least three carbon atoms in the chain. Suitable esters include fatty acid esters such as cocoates, isostearates, myristates, and palmitates and wax esters such as alkyl-branched esters of an aliphatic carboxylic acid and an aliphatic alcohol.

20 Claims, No Drawings

CHROMOGENIC COMPOSITION FOR USE IN PRESSURE-SENSITIVE RECORD MATERIAL

This invention relates toga chromogenic composition for use in pressure-sensitive record material, particularly pressure-sensitive copying paper, also known as carbonless copying paper.

Pressure-sensitive copying paper is well-known and is widely used in the production of business forms sets. Various types of pressure-sensitive copying paper are known, of which the most widely used is the transfer type. A business forms set using the transfer type of pressure-sensitive copying paper comprises an upper sheet (usually known as a "CB" sheet) coated on its lower surface with microcapsules containing a solution in an oil solvent or solvent composition of at least one chromogenic material (alternatively termed a colour former) and a lower sheet (usually known as a "CF" sheet) coated on its upper surface with a colour developer composition. If more than one copy is required, one or more intermediate sheets (usually known as "CFB" sheets) are provided, each of which is coated on its lower surface with microcapsules and on its upper surface with colour developer composition. Imaging pressure exerted on the sheets by writing, typing or impact printing (e.g. dot matrix or daisy-wheel printing) ruptures the microcapsules, thereby releasing or transferring chromogenic material solution on to the colour developer composition and giving rise to a chemical reaction which develops the colour of the chromogenic material and so produces a copy image.

In a variant of the above-described arrangement, the solution of chromogenic material. may be present as dispersed droplets in a continuous pressure-rupturable matrix instead of being contained within discrete pressure-rupturable microcapsules.

In another type of pressure-sensitive copying system, usually known as a self-contained or autogenous system, microcapsules and colour developing co-reactant material are coated onto the same surface of a sheet, and writing or typing on a sheet placed above the thus-coated sheet causes the microcapsules to rupture and release the solution of chromogenic material, which then reacts with the colour developing material on the sheet to produce a coloured image.

The solvents used to dissolve the chromogenic materials in pressure-sensitive copying papers as described above have typically been derived from petroleum or coal deposits. Partially hydrogenated terphenyls, alkyl naphthalenes, diarylmethane derivatives, dibenzyl benzene derivatives chlorinated paraffins are examples of such solvents. These materials, often termed "prime solvents" are usually mixed with cheaper diluents or extenders such as kerosene, which although of lesser solvating power, give rise to more cost-effective solvent compositions. Vegetable oils have also been disclosed as solvents for use in pressure-sensitive copying papers, and are in,principle an alternative to the use of petroleum or coal-based solvent compositions. However, to the best of our knowledge, there has been no commercial utilization of vegetable oil solvents in pressure-sensitive copying papers before the priority date hereof.

A number of types of ester have also been proposed for use in solvent compositions for pressure-sensitive copying paper. For example, European Patent Application No. 24898A and British Patent No. 1526353 each disclose the use of a blend of an aromatic hydrocarbon with specified aliphatic acid diesters.

The use of phthalates, for example dibutyl phthalate, and certain other esters, for example maleates, as solvents or pigment-suspending media for pressure-sensitive copying paper has also been proposed, see for example U.S. Pat. No. 3,016,308.

European Patent Application No. 390432 discloses the use in pressure-sensitive recording material of certain non-ionic surfactants as an aid to dispersion (rather than dissolution) of solid chromogenic material in a hydrophobic liquid dispersing medium. These surfactants include certain fatty acid esters, particularly sorbitan esters, polyoxyethylene sorbit esters, polyethylene glycol esters of fatty acids, and polyoxyethylene alkylphenyl esters.

European Patent Application No. 487347A discloses the use of solvent compositions comprising specified polyglycol ethers in combination with a dialkyl ester of an aliphatic dibasic acid and/or an ester of a monobasic aromatic acid.

Our European Patent Application No. 520639A, which was unpublished at the priority date hereof, discloses that certain problems associated with the use of vegetable oil solvents can be eliminated or reduced if the vegetable oil is used together with a proportion of a mono- or di-functional ester of a non-aromatic mono-carboxylic acid having a saturated or unsaturated straight or branched hydrocarbon chain with at least three carbon atoms in the chain.

It has now been realized that esters as just described (and also trifunctional esters) constitute advantageous solvents for pressure-sensitive copying paper in their own right, i.e. when not mixed with vegetable oil(s) as disclosed in European Patent Application No. 520639A or hydrocarbon oils as disclosed in European Patent Application No. 24898A. The identification of this new and useful class of solvents for pressure-sensitive copying paper constitutes a significant advance in the art. This is particularly so as many of these ester solvents are derivable from natural vegetable or animal oils, i.e. from the world's renewable resources as opposed to non-renewable resources such as petroleum or coal deposits from which virtually all the previous commercially-significant pressure-sensitive copying paper solvents are derived. In addition, these ester solvents are generally colourless, are of high chemical stability, and transfer readily on microcapsule rupture, all of which properties are of key importance in pressure-sensitive copying paper. By contrast, many of the solvents previously proposed in the patent literature are deficient in these respects.

Accordingly, the present invention provides a chromogenic composition for use in pressure-sensitive record material, said composition comprising chromogenic material in an ester vehicle, characterized in that the ester vehicle comprises a mono-, di- or tri-functional ester of a non-aromatic mono-carboxylic acid having a saturated or unsaturated straight or branched hydrocarbon chain with at least three carbon atoms in the chain (i.e. in addition to the carboxyl carbon atom), with the proviso that the ester is not present in a blend with a vegetable oil, and, in the case of a di-ester, is not present in a blend with hydrocarbon oil. Mono-functional esters are preferred.

The invention also extends to the chromogenic composition when microencapsulated and to pressure-sensitive record material utilizing the chromogenic composition, either contained in microcapsules or otherwise present in the form of isolated droplets in a pressure-rupturable barrier.

The carboxyl group of the ester used in the present invention is preferably a terminal carboxyl group, and the ester is preferably an ester of a fatty acid, i.e. an ester of an acid derivable from an animal or vegetable oil. Such an ester will hereafter be referred to for convenience as a "fatty acid ester". Whilst the expression "fatty acid" is not always defined consistently in technical reference books, the usage in this specification, i.e. as meaning an acid derivable from an animal or vegetable oil, is consistent with the definition in "Hawley's Condensed Chemical Dictionary", Eleventh Edition, revised by N. Irving Sax and Richard J. Lewis, Sr. published by Van Nostrand Reinhold Company. Fatty acids are composed of a saturated or unsaturated straight or branched hydrocarbon chain with a single terminal carboxyl group, the total number of carbon atoms present (including the carboxyl group) generally being an even number from 4 to 22.

By way of example, the fatty acid ester may be of a saturated straight or branched-chain aliphatic fatty acid such as myristic acid, captic acid, caprylic acid, stearic acid, isostearic acid, palmitic acid, or lauric acid, or of an unsaturated fatty acid such as oleic acid, or of an acid of mixed composition, for example coconut acid, i.e. a mixture of fatty acids derived from hydrolysis of coconut oil. The constituent fatty acids of coconut acid have chain lengths of 6 to 18 carbon atoms and are chiefly lauric, capric, myristic, palmitic and oleic acids. An ester of coconut acid will hereafter be referred to as a "cocoate" although the term "coconutate" is also in use (it should be noted that the expression "cocoate" has no connection with the acids present in cocoa oil or cocoa butter).

The ester moiety of the fatty acid or other ester used in the present solvent composition may vary widely. For example, it may have only one carbon atom, i.e. methyl, or several carbon atoms, for example isopropyl, octyl or 2-ethylhexyl. Such ester moieties are all mono-functional. An example of a suitable di-functional ester moiety is propylene glycyl (i.e. an ester moiety derived from propylene glycol). An example of a suitable tri-functional ester is a glyceryl ester. Such esters are synthesised by esterification of glycerol or other suitable trihydric alcohol with mono-carboxylic acid, and are thus to be distinguished from naturally-occurring tri-glycerides present in vegetable oils.

Numerous examples of mono-, di-functional or tri-esters of fatty acids as disclosed above are commercially available products, being used in industry for a variety of applications, particularly cosmetics and other personal care products. They can be manufactured by esterification, with suitable alcohols, of fatty acids derived by refining and/or distillation of crude vegetable oils. The alcohols required for esterification are widely available Specific examples of suitable fatty acid esters for use in the present solvent composition include the following, which may be used singly or in combination:

| | |
|---|---|
| 2-ethylhexyl cocoate | (EHC) |
| 2-ethylhexylisostearate | (EHIS) |
| isopropyl myristate | (IPM) |
| methyl oleate | (MO) (see note 1) |
| propylene glycol dicaprylate/caprate) | (PGCC) (see note 2) |
| methyl isostearate | (MIS) |
| glyceryl tricaprylate/caprate | (GTCC) (see note 3) |
| methyl palmitate | (MP) |
| propylene glycol di-isostearate | (PGDIS) |
| glyceryl trioctanoate | (GTO) |

Notes

1. "Methyl oleate" (MO) is a commercial name for a mixture of fatty acid methyl esters in which the major component (c. 73%) is methyl oleate but which also contains other unsaturated materials, namely methyl linoleate (c. 9%), methyl palmitoleate (c. 5%), methyl linolenate (c. 2%) and various saturated methyl monoesters having from 4 to 18 acid moiety carbon atoms (c. 10% in total).

2. PGCC has caprylic acid and capric acid as the main acid moieties (c. 59% and c. 36% respectively) but also contains minor proportions of other acid moieties, principally lauric acid (c. 5%).

-continued

3. GTCC has caprylic acid and capric acid as the main acid moieties (c. 72% and c. 26% respectively)

All of the above-listed esters are commercially-available, for example from Unichema International of Gouda, The Netherlands.

In general, the acid moiety of a fatty acid ester(s) for use as a solvent in the present pressure-sensitive copying paper will have actually been derived from a natural oil. However, a fatty acid which is of a kind derivable from a natural oil but which was actually manufactured other than from a natural oil source could in principle be used as a solvent in the present pressure-sensitive copying paper. An ester made from acid manufactured in this way is referred to herein as a "synthesized fatty acid ester".

As an alternative to the use of a fatty acid ester or synthesized fatty acid ester, closely related esters of the kind found in naturally-occurring lipids may be employed. Such esters, which are often termed wax esters, are generally alkyl-branched esters of aliphatic carboxylic acids and aliphatic alcohols. They occur naturally in secretions of certain birds and animal skins (for example in human skin), and in yeast, fungi and other organisms. Although they occur naturally, their commercially-available forms are generally synthesized from non-naturally derived alcohol and acid starting materials. 2-ethylhexyl-2-ethylhexanoate (EHEH) is an example of a commercially-available synthesised wax ester which is usable in the present solvent compositions, and is also available from Unichema International. Further information on naturally-occurring wax esters can be found, for example, in "Chemistry and Biochemistry of Natural Waxes", edited by P E. Kollattukudy, published by Elsevier, Amsterdam, in 1976.

Although in principle all esters of the kind defined herein are usable as solvents in the present pressure-sensitive copying papers, in practice certain of them have properties or side effects which may make them unsuitable. For example, the esters must have a workable viscosity for encapsulation. Also, they must not have an unacceptable odour (although some esters which are usable in principle may have an unacceptable odour due to the presence of impurities, which would not necessarily be present in all samples). Additionally, we have found that samples of certain fatty acid esters, for example polyethyleneglycol cocoate, have a desensitizing effect, and prevent or reduce proper colour development of chromogenic material on contact with colour developer. Again, this may well be due to the presence of impurities such as polyethylene glycol, which is known as a desensitizer for pressure-sensitive copying paper. Thus when seeking to work the invention, care must be taken to screen potentially suitable esters for drawbacks such as just discussed. Such screening does of course require only very simple tests or procedures, and needs no further description. Problems caused by. the presence of undesirable impurities can in principle be solved by improved purification techniques.

Whilst a workable viscosity is needed to facilitate encapsulation, the use of an ester which is solid or near-solid at ambient temperatures is not ruled out, provided that it becomes adequately mobile at higher temperatures (say up to about 50°–55° C.) at which. pumping, stirring and microcapsule wall formation are still feasible without unacceptable increases in energy and other costs.

The solvent in the present pressure-sensitive copying paper is preferably composed substantially entirely of the defined ester(s).

In use, the present solvent, containing dissolved chromogenic materials, can be microencapsulated and used in conventional manner The microcapsules may be produced by coacervation of gelatin and one or more other polymers, e.g. as described in U.S. Pat. Nos. 2,800,457; 2,800,458; or 3041289; or by in situ polymerisation of polymer precursor material, e.g. as described in U.S. Pat. Nos. 4,001,140; 4,100,103; 4,105,823 and 4,396,670.

The chromogenic materials used in the microcapsules may be, for example, phthalide derivatives, such as 3,3-bis(4-dimethylaminophenyl)-6-dimethylaminophthalide (CVL) and 3,3 -bis-(1-octyl-2-methylindol3-yl)phthalide; fluoran derivatives, such as 2'anilino-6'-diethylamino-3'-methylfluoran, 6' -dimethylamino-2'-(N-ethyl-N-phenylamino-4'-methylfluoran), 2' -N-methyl-N-phenylaminofluoran-6'-N-ethyl-N(4-methylphenylaminofluoran, or 3'-chloro-6'-cyclohexylaminofluoran; or spirobipyran derivatives such as 3'-i-propyl-7-dibenzylamino-2,2'-spirobi-(2H-1-benzopyran). Triphenylmethyl chromogenic materials as disclosed in European Patent Application No. 262569A may also be used.

The chromogen-containing microcapsules, once produced, are formulated into a coating composition with a suitable binder, for example starch or a starch/carboxymethylcellulose mixture, and a particulate agent (or "stilt material") for protecting the microcapsules against premature microcapsule rupture. The stilt material may be for example, wheatstarch particles or ground cellulose fibre floc or a mixture of these. The resulting coating composition is then applied by conventional coating techniques, for example metering roll coating or air knife coating.

Apart from the nature of the solvent, the present pressure-sensitive copying paper may be conventional. Such paper is Very widely disclosed in he patent and other literature, and so requires only brief further discussion.

The thickness and grammage of the present paper (before microcapsule coating) may be as is conventional for this type of paper, for example the thickness may be about 60 to 90 microns and the grammage about35 to 50 g $m^{-2}$, or higher, say up to about 100 g $m^{-2}$, or even more. This grammage depends to some extent on whether the final paper is for CB or CFB use. The higher grammages just quoted are normally applicable only to speciality CB papers.

The colour developer material used may be an acid clay, e.g. as described in U.S. Pat. No. 3,753,761; a phenolic resin, e.g. as described in U.S. Pat. No. 3,672,935 or U.S. Pat. No. 4,612,254; or an organic acid or metal salt thereof, e.g. as described in U.S. Pat. No. 3,024,927, European Pat. Applications Nos. 275107A or 428994A, or German Offenlegungsshrift No. 4110354A.

The invention will now be illustrated by the following Example in which all parts, percentages and proportions are by weight unless otherwise stated.

EXAMPLE 1

This illustrates the use of two fatty acid mono-esters EHC and EHIS, and one wax ester solvent, namely EHEH, together with a conventional alkylnaphthalene/kerosene solvent composition as a control for comparison purposes.

Chromogenic materials were first dissolved in the esters EHC and EHIS, and one wax ester solvent, to produce solutions for encapsulation. These chromogenic materials are all commercially available and have a long history of use in the art. They were a 5% total concentration mixture of CVL, green and black fluorans, and a red bis-indolyl pthalide, and were used in relative proportions such as to give a black print, as is conventional in the art. The control composition contained a 5.5% total concentration mixture of CVL, a relatively slow-developing blue colour former, and green, black, orange and red fluorans. This control chromogenic material blend and solvent composition is used in commercial production of pressure-sensitive copying paper.

The resulting chromogenic material solutions were separately encapsulated on a pilot-plant scale by means of a generally conventional gelatin coacervation technique as disclosed in British Pat. No. 870476, using carboxymethylcellulose and vinylmethylether/maleic anhydride copolymer as anionic colloids. As an initial step of the encapsulation process, the chromogenic material solution was dispersed with stirring in gelatine solution at 50°–55° C., and the resulting dispersion was then milled to the desired median droplet size. The resulting milled dispersion, still at 50°–55° C. was diluted with additional water and vinylmethylether/maleic anhydride copolymer solution was added, followed by carboxymethylcellulose solution. Acetic acid was then added to adjust the pH to about 4.2 and thereby bring about coacervation. The coacervate deposited about the emulsified oil droplets so as to form liquid-walled microcapsules. The mixture was then chilled to 10° C. to solidify the initially-liquid coacervate walls, after which a hardening agent (glutaraldehyde) was added to cross-link the Walls and prevent their re-dissolving when the temperature rises when the chilling operation is concluded. A further addition of vinylmethylether/maleic anhydride copolymer was then made. The resulting microcapsule dispersion was then adjusted to pH 7 with sodium hydroxide solution.

No problems were experienced with the encapsulation of any of the samples.

The finished microcapsule dispersions were separately formulated into conventional CB coating compositions using a gelatinized starch binder and a mixture of wheatstarch particles and ground cellulose fibre floc as an agent for preventing premature microcapsule rupture. The resulting CB coating compositions were applied to the uncoated surface of commercially-available 46 g $m^{-2}$ CF paper by means of a pilot-plant metering roll coater at a range of coatweights for each sample. The CF paper utilised acid-washed dioctahedral montmorillonite clay as the active colour developing ingredient.

The resulting paper was subjected to the following tests:

1. Calender Intensity (CI) Test

This involved superimposing a strip of the microcapsule-coated paper under test onto a strip of conventional acid-washed montmorillonite colour developer coated paper, passing the superimposed strips through a laboratory calender to rupture the capsules and thereby produce a colour on the colour developer strip, measuring the reflectance of the thus-coloured strip (I) and expressing the result (I/Io) as a percentage of the reflectance of an unused control colour developer strip ($I_o$). Thus the lower the calender intensity value (I/Io), the more intense the developed colour.

The reflectance measurements were done both two minutes after calendering and forty-eight hours after calendering, the sample being kept in the dark in the interim. Measurements were made both after two minutes and after forty-eight hours, so as to allow for the effect of additional colour development with time.

In each case the calender intensity value is indicative of the ability of the microcapsule-coated paper to give rise to a good copy image.

2. Post-Printing Discoloration Tests

When CB and CFB papers are subjected to a printing process as part of the production of business forms sets, a certain amount of microcapsule damage tends to occur, and this results in release of chromogenic material solution which can transfer to an adjacent CF surface and produce discolouration as a result of formation of many small coloured specks. This is known as "post-printing discolouration" (or "post-print blacking", or "post-print blueing", depending on the colour of the copy image).

Post-printing discolouration was assessed by both a predictive test (the extended ram test) and by assessment of samples after they had actually been printed. In the extended ram test, a stack of twenty CFB sheets of each sample was placed under a hydraulic ram and subjected to a nominal ram pressure of 1724 kPa (250 p.s.i) for 30 minutes. The extent of discolouration was assessed by visual ranking against numbered comparison standards.

3. Discolouration on Storage Tests

It is found that CFB paper sometimes tends to discolour gradually on storage prior to use. The reasons for this include the presence in the microcapsule coating of a small proportion of unencapsulated chromogenic material solution, gradual permeation of chromogenic material solution through the microcapsule walls, and premature capsule damage as a result of the strains imposed by reel tensions, or by the weight of higher sheets in the case of stacked sheeted products. In each case, the free chromogenic material solution can potentially migrate up through the paper and into contact with the colour developer coating on the top surface. The effect is primarily seen as an overall greying (or blueing in the case of a blue-copy product) and is referred to generally as discolouration on storage.

Two different tests were carried out:

i. Contact Storage

A stack of twenty CFB sheets of each sample, all with their CF surfaces uppermost, were placed under a 2 kg weight in an oven at 60° C. for 3 weeks. The extent of discolouration on the CF surfaces was assessed visually.

ii. Accelerated Ageing

Single CFB sheets of each sample were placed in an oven for 3 weeks at 32° C. and 90% relative humidity. This test is intended to simulate the effect of extended storage prior to use, particularly in countries with hot humid climates where discolouration on storage is most problematical.

The extent of discolouration on the CF surfaces was assessed visually.

The results of the calender intensity tests are set out in Table 1 below:

TABLE 1

| Solvent | Dry CB Coatweight (g m$^{-2}$) | Calender Intensity 2 mins | Calender Intensity 48 hours |
|---|---|---|---|
| EHC | 4.1 | 66.7 | 64.3 |
| | 4.7 | 65.4 | 62.4 |
| | 5.5 | 64.4 | 60.9 |
| | 6.5 | 63.7 | 60.6 |
| | 6.8 | 62.6 | 59.1 |
| EHEH | 3.5 | 63.3 | 61.0 |
| | 5.4 | 63.1 | 61.0 |
| | 5.6 | 60.7 | 58.8 |
| | 6.2 | 58.7 | 56.4 |
| | 8.2 | 58.8 | 56.0 |
| EHIS | 4.1 | 67.8 | 64.4 |
| CONTROL | 4.7 | 66.4 | 63.1 |
| | 5.2 | 65.2 | 61.8 |
| | 6.0 | 63.5 | 60.1 |

TABLE 1-continued

| Solvent | Dry CB Coatweight (g m$^{-2}$) | Calender Intensity 2 mins | Calender Intensity 48 hours |
|---|---|---|---|
| | 6.5 | 63.8 | 59.8 |
| | 3.3 | 67.6 | 62.1 |
| | 4.3 | 65.7 | 62.2 |
| | 4.9 | 64.4 | 58.0 |
| | 5.5 | 62.6 | 57.9 |
| | 6.2 | 62.1 | 60.6 |

Exact comparisons are difficult because of the different dry CB coatweights obtained but it will be seen that the esters gave comparable calender intensity results to those of the control, thereby demonstrating that the new ester solvents are effective for image formation to existing commercial standards.

The results of extended ram testing showed the three ester-containing papers to be equivalent and to exhibit marginally less discolouration than the control sample. Examination of CFB sheets after they had actually been printed confirmed that the ester-containing samples and the control gave similar performance. These results demonstrate the technical acceptability of the ester solvents.

The print quality obtained with the ester samples was also fully acceptable.

In the contact storage and accelerated ageing tests (visual assessment) the ester samples showed comparable discolouration behaviour to the control sample, again demonstrating the technical acceptability of the esters.

EXAMPLE 2

This illustrates the use of two further fatty acid monoesters, namely IPM, which is liquid at ambient temperatures and MP, which is solid at ambient temperatures (melting point 29°–30° C.). A conventional alkylnaphthalene/kerosene solvent composition was also Used as a control for comparison purposes.

The procedure was generally as described in Example 1, although the encapsulation. was carried out on a laboratory rather than pilot plant scale and the pilot plant coater used was correspondingly smaller. In consequence, the final papers were not printed A further departure from Example 1 was the use of a 6 4% total concentration chromogenic material mixture giving a black copy image, the chromogenic materials used being CVL, green and black fluorans, and a red bis-indolyl phthalide. The MP was heated to melt it prior to dissolving the chromogenic materials and not allowed to cool until after encapsulation was complete.

The results of the calender intensity tests are set out in Table 2 below:

TABLE 2

| Ester | Dry CB Coatweight (g m$^{-2}$) | Calender Intensity 2 mins | Calender Intensity 48 hours |
|---|---|---|---|
| IPM | 5.9 | 62.4 | 55.9 |
| | 5.5 | 54.6 | 49.7 |
| | 4.9 | 55.6 | 50.9 |
| | 4.7 | 56.6 | 52.0 |
| MP | 4.6 | 60.4 | 55.0 |
| | 4.6 | 55.2 | 50.7 |
| | 4.2 | 63.5 | 58.2 |

TABLE 2-continued

| Ester | Dry CB Coatweight (g m$^{-2}$) | Calender Intensity 2 mins | 48 hours |
|---|---|---|---|
| | 3.5 | 65.7 | 60.6 |
| CONTROL | 5.4 | 61.8 | 57.4 |
| | 4.8 | 61.8 | 57.2 |
| | 4.4 | 62.6 | 57.9 |
| | 3.6 | 62.9 | 58.3 |

Exact comparisons are difficult because of the different dry CB coatweights obtained, and there appear to be some anomalies in the data, but it will be seen that, in general, the esters gave comparable or better calender intensity results to those of the control, thereby demonstrating that the esters are effective for image formation to existing commercial standards.

The results of extended ram testing showed the MP paper to have the least discolouration. The control paper was marginally less discoloured than the IPM paper, but the latter was well within the limits of acceptability.

In the contact storage and accelerated ageing tests (visual assessment), the controls sample was the least discoloured with the IPM sample showing slightly more discolouration. Nevertheless it was within the limits of acceptability. The MP sample was slightly more discoloured still, but was acceptable.

EXAMPLE 3

This illustrates the use of a di-ester (PGDIS), together with a control as described previously and a further evaluation of MP. The procedure employed was generally as described in Example 2.

The results of the calender intensity tests are set out in Table 3 below:

TABLE 3

| Ester | Dry CB Coatweight (g m$^{-2}$) | Calender Intensity 2 mins | 48 hours |
|---|---|---|---|
| PGDIS | 3.7 | 72.2 | 66.1 |
| | 3.8 | 69.7 | 63.2 |
| | 4.2 | 69.1 | 62.6 |
| | 4.8 | 67.2 | 60.7 |
| | 5.0 | 67.8 | 61.2 |
| MP | 3.6 | 70.1 | 64.7 |
| | 4.1 | 69.4 | 63.6 |
| | 4.5 | 65.9 | 60.5 |
| | 5.1 | 67.8 | 62.1 |
| | 5.9 | 69.4 | 63.4 |
| CONTROL | 4.0 | 69.0 | 64.7 |
| | 3.9 | 67.8 | 63.5 |
| | 4.5 | 67.0 | 62.6 |
| | 4.6 | 65.4 | 60.8 |
| | 4.9 | 65.8 | 61.1 |

Once again, exact comparisons are difficult because of the different dry CB coatweights obtained, and there appear to be some anomalies in the data, but it will be seen that, in general, the esters gave comparable calender intensity results to those of the control, thereby demonstrating that the esters are effective for image formation to existing commercial standards.

The results of extended ram testing showed the control samples to have the least discolouration, and the PGDIS sample to be marginally worse than the MP sample. However both ester samples were well within,the limits of acceptability.

In the contact storage and accelerated ageing tests (visual assessment) the control sample was the least discoloured, with the PGDIS sample being slightly less discoloured than the MP sample. However both ester samples were acceptable.

EXAMPLE 4

This illustrates the use of two tri-esters, namely GTCC and GTO, together with a control as described previously. The procedure employed was generally as described in Example 2. The results of the calender intensity tests are set out n Table 4 below:

TABLE 4

| Ester | Dry CB Coatweight (g m$^{-2}$) | Calender Intensity 2 mins | 48 hours |
|---|---|---|---|
| GTCC | 5.3 | 68.3 | 61.8 |
| | 6.0 | 68.1 | 61.8 |
| | 6.3 | 68.8 | 62.5 |
| | 7.2 | 68.8 | 62.7 |
| | 8.1 | 69.4 | 63.5 |
| GTO | 5.3 | 70.2 | 63.7 |
| | 6.1 | 70.3 | 64.7 |
| | 6.8 | 70.0 | 64.8 |
| | 7.8 | 70.7 | 65.7 |
| | 8.3 | 70.3 | 65.2 |
| CONTROL | 4.8 | 63.7 | 58.4 |
| | 5.4 | 62.5 | 57.2 |
| | 6.0 | 62.2 | 56.9 |
| | 6.6 | 62.1 | 57.0 |
| | 7.4 | 61.0 | 56.5 |

Once again, exact comparisons are difficult because of the different dry CB coatweights obtained, but it will be seen that the esters gave somewhat worse calender intensity results than those of the control. Nevertheless, the image intensity was judged to be acceptable for a commercial product.

The results of extended ram testing showed the control samples to have the least discolouration, and the GTO sample to be marginally worse than the GTCC sample. However, both ester samples were judged to be within the limits of acceptability.

In the accelerated ageing test, (one week period only), all three samples were equivalent and showed very little discolouration. In the contact storage test (one week period only), the GTCC and GTO samples were marginally more discoloured than the control sample, but the extent of discolouration was very small. It was concluded from these tests that the ester samples were of an acceptable standard.

We claim:

1. A pressure-sensitive record material comprising a chromogenic composition, wherein said chromogenic composition comprises a chromogenic material in an ester vehicle, said ester vehicle (i) consisting essentially of methyl palmitate, or (ii) comprising methyl palmitate and one or more other mono-, dir- or tri-functional ester(s) of a non-aromatic mono-carboxylic acid having a saturated or unsaturated straight or branched hydrocarbon chain with at least five carbon atoms in the chain in addition to the carbon atom of the carboxyl group, or (iii) when said ester vehicle contains no methyl palmitate, said ester vehicle comprising a mono-, di- or tri-functional ester oil a non-aromatic mono-carboxylic acid having a saturated or unsaturated straight or branched hydrocarbon chain with at leas five carbon atoms in the chain in addition to the carbon atom of the carboxyl group;

the ester being free of a blend with a vegetable oil, and where the ester is a di-ester, the ester is free of a blend with hydrocarbon oil.

2. A pressure-sensitive record material according to claim 1, wherein the carboxyl group of said ester is a terminal carboxyl group.

3. A pressure-sensitive record material according to claim 1, wherein the ester is an ester of a fatty acid.

4. A pressure-sensitive record material according to claim 3, wherein the ester is an ester of a saturated straight or branched-chain aliphatic fatty acid.

5. A pressure-sensitive record material according to claim 4, wherein the ester is an ester of a saturated straight or branched-chain aliphatic fatty acid selected from the group consisting of myristic acid, capric acid, caprylic acid, stearic acid, isostearic acid, palmitic acid, and lauric acid.

6. A pressure-sensitive record material according to claim 3, wherein the ester is an ester of an unsaturated fatty acid.

7. A pressure-sensitive record material according to claim 6, wherein the ester is an ester of oleic acid.

8. A pressure-sensitive record material according to claim 3, wherein the ester is an ester of coconut acid.

9. A pressure-sensitive record material according to claim 1, wherein the ester comprises at least one of the group of 2-ethylhexyl cocoat, 2-ethylhexylisostearate, isopropyl myristate, methyl oleate, propylene glycol dicaprylate/caprate, methyl isostearate, glyceryl tricaprylate/caprate, methyl palmitate, propylene glycol diisostearate, and glyceryl trioctanoate.

10. A pressure-sensitive record material according to claim 1, wherein the ester is a wax ester.

11. A pressure-sensitive record material according to claim 10, wherein the wax ester is an alkyl-branched ester of an aliphatic carboxylic acid and an aliphatic alcohol.

12. A pressure-sensitive record material according to claim 10, wherein the ester is 2-ethylhexyl-2-ethylhexanoate.

13. A pressure-sensitive record material according to claim 1, said composition consisting essentially of the ester.

14. A pressure-sensitive record material according to claim 1, wherein the chromogenic composition is microencapsulated.

15. A pressure-sensitive record material according to claim 2, wherein the ester is an ester of a fatty acid.

16. A pressure-sensitive record material according to claim 15, wherein the ester is an ester of cocount acid.

17. A pressure-sensitive record material according to claim 15, wherein the ester is an ester of a saturated straight or branched-chain aliphatic fatty acid.

18. A pressure-sensitive record material according to claim 17, wherein the ester is an ester of a saturated straight or branched-chain aliphatic fatty acid selected from the group consisting of myristic acid, capric acid, caprylic acid, stearic acid, isostearic acid, palmitic acid, and lauric acid.

19. A pressure-sensitive record material according to claim 15, wherein the ester is an ester of an unsaturated fatty acid.

20. A pressure-sensitive record material according to claim 19, wherein the ester is an ester of oleic acid.

* * * * *